March 22, 1955     H. E. SHEETS     2,704,438
STARTING FUEL SYSTEM FOR JET AND ROCKET MOTORS
Filed Feb. 10, 1951     2 Sheets-Sheet 1

INVENTOR.
Herman E. Sheets
BY
ATTORNEY

March 22, 1955      H. E. SHEETS      2,704,438

STARTING FUEL SYSTEM FOR JET AND ROCKET MOTORS

Filed Feb. 10, 1951      2 Sheets-Sheet 2

INVENTOR.
Herman E. Sheets

BY

ATTORNEY

United States Patent Office 2,704,438
Patented Mar. 22, 1955

2,704,438

STARTING FUEL SYSTEM FOR JET AND ROCKET MOTORS

Herman E. Sheets, Akron, Ohio, assignor to Goodyear Aircraft Corporation, Akron, Ohio, a corporation of Delaware Application February 10, 1951, Serial No. 210,347

1 Claim. (Cl. 60—39.14)

This invention relates to fuel supply systems for internal combustion motors, such as turbo jet, ram jet, and rocket motors, and in particular to fuel supply systems operated by injector type pumps in absence of any moving parts.

Hitherto, it was the practice in fuel supply systems for jet and rocket motors to pump propellant liquids into the combustion chamber by means of mechanical pumps. Also known is the use of injector type booster pumps for delivering from a reservoir liquid fuel at atmospheric pressure to a mechanical feed pump at a higher pressure which pump in turn furnishes the driving fluid for the injector booster pump. However, mechanical pumps have the disadvantage that they require special drives, are heavier, and their installation is more complicated and restricted than is the case in using injector type pumps only. The use of injector pumps for power plant fuel systems is of particular importance for aircraft where saving of weight is most essential.

It is the general object of the invention to avoid and overcome the foregoing and other difficulties of and objections to prior art practices by the provision of injector pumps for operating the fuel supply systems of turbo jet, ram jet, as well as rocket motors, either by one or more injector pumps, depending on whether only one or more liquid propellant fluids are to be supplied to a motor, with the pumps being operated by one of the propellants put into energized form by heating it.

Other objects of the invention are reduction of weight, and smaller size of the pumps, freedom of installation, elimination of auxiliary power requirements after starting, and lower cost.

The aforesaid objects of the invention and other objects which will become apparent as the description proceeds are achieved by using, in case of only one propellant fluid, such as gasoline and similar hydrocarbon liquids, a single injector pump which is energized by heated fuel developed from liquid fuel contained in a starting heater or vaporizer. The pump connected to a service fuel tank takes the fuel from the tank and delivers it at increased pressure to a feed duct supplying the greater portion of the fuel carried therein to the motor and the remaining portion thereof being fed back over a heat exchanger or vaporizer, energized by motor exhaust gases, as driving fluid to the pump. As soon as the main heat exchanger develops sufficient driving fluid, that is, when the motor operates normally, the starting heater is turned off.

Whereas the above-outlined description has to do with only one fluid, other similar arrangements are illustrated and described later on for two-fluid propellants used for rocket motors. Depending upon the thermodynamic characteristics of the driving fluids and the fluids to be pumped, the temperatures and pressures selected, according to the thermodynamic process, may be such that initial state of the driving fluid is a liquid, a vapor, a gas and/or mixtures and combinations of these phases. For instance in one application the driving fluid may be a hot liquid which is expanded in the injector inlet nozzle into a low pressure fluid jet consisting of part liquid and part vapor, whereas in another application the driving fluid may be saturated vapor which is expanded in the inlet nozzle into a fluid jet consisting of part liquid and part vapor. In a third application with another fluid saturated vapor is expanded in the inlet nozzle into a fluid jet consisting of superheated vapor.

For a better understanding of the invention reference should be had to the accompanying drawings, wherein.

Figure 1:
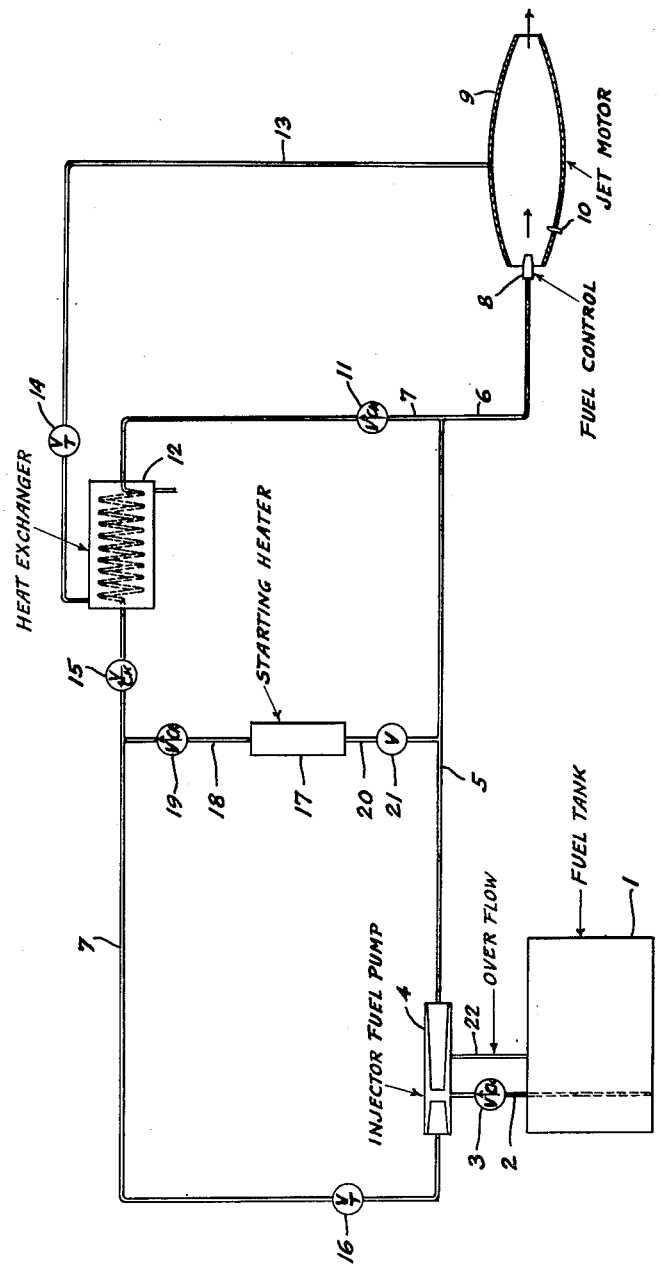
Fig. 1 is a schematic view of an embodiment of the invention showing a ram jet or turbo jet motor fuel supply system operated solely by an injector fuel pump driven by heat pressurized fuel.

With specific reference to the form of the invention illustrated in Fig. 1, the numeral 1 designates a tank to liquid fuel, for instance, gasoline, from which leads a suction duct 2, containing a check valve 3, to an injector type pump 4 for delivering liquid fuel from tank 1 by a duct 5 to ducts 6 and 7. Duct 6 feeds the greater portion of the fuel to be delivered by pump 4 through a control nozzle 8 into the combustion chamber of the motor 9 which is provided with a spark plug 10, whereas duct 7 is connected to the driving fluid inlet of the pump to feed the remaining portion of the fuel to be delivered by the pump back to the pump as heat pressurized driving fluid. For this purpose duct 7, provided with a fuel metering check valve 11, passes, wound in coil shape, through a heat exchanger or vaporizer 12 to which connects a motor exhaust duct 13 containing a throttle valve 14 to control the exhaust gas supply which in turn effects the fuel to be heat pressurized. A check valve 15 and a throttle valve 16 in the duct 7 control the flow of the fuel in heat energized condition as pump driving fluid. A starting heater 17, preferably of the electric type, for holding a certain quantity of liquid fuel is connected by a duct 18, containing a check valve 19, with the portion of duct 7 carrying the driving fuel. To facilitate replenishing fuel consumed in the heater 17, the heater is connected by a duct 20, containing a stop valve 21, with the delivery duct 5 of the pump. An overflow duct 22 serves to drain excessive fuel from the pump 4 to the tank 1.

For starting the fuel pump and thereby the motor, the heater 17 is energized whereby the fuel contained therein is heated to be used as driving fluid for the pump which, then, draws from tank 1 liquid fuel the greater portion of which is forced into the combustion chamber of motor 9 to be ignited and burned therein. A small portion of the motor exhaust gases are diverted to the heat exchanger 12 from where the fuel is fed back as driving fluid to the pump. After sufficient driving fluid is produced in the heat exchanger and the motor operates normally, that is, continuous combustion is achieved, the ignition and the starting heater 17 are shut off. Then the driving fluid furnished by the heat exchange 12 keeps the pump and in turn the motor in continuous operation in a most simplified manner without mechanical driving means. Flow control in this fuel supply system may be obtained by a combined flow and pressure control. Reduced delivery pressure may be obtained by throttling the driving fluid inlet pressure to the injector pump. This in turn results in lower flow through the feed orifice injection nozzle and into the motor combustion chamber.

Figure 2:
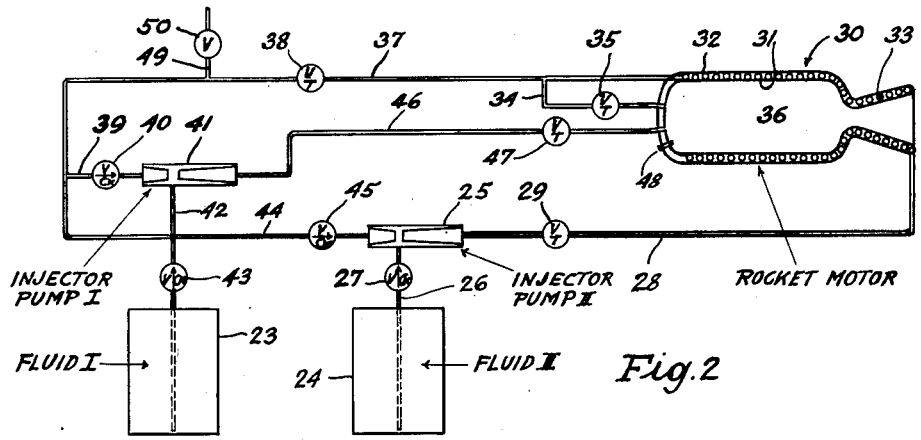
Fig. 2 is a view, similar to that of Fig. 1, but shows a two-fluid fuel supply system for a rocket motor in which two injector pumps, one for each fluid, are employed, and both pumps being driven by heated, pressurized fuel.

Whereas the fuel supply system shown in Fig. 1 is used in conjunction with jet motors, using only one liquid propellant, Fig. 2 illustrates a fuel supply system for rocket motors which is operated by two liquid propellants, for instance, fluid I, an oxidizer, which may be liquid oxygen, stored in tank 23, and fluid II, a fuel, which may be alcohol, stored in tank 24. To tank 24 is connected an injector pump 25 by a duct 26 provided with a check valve 27. A duct 28 containing a throttle valve 29 is connected to the delivery outlet of pump 25 and leads to the exhaust end of a rocket motor 30 having walls 31 and 32 between which the duct 28 forms a heating coil 33 which emerges from the closed end of motor 30 and is branched off into a duct 34, leading over a throttle valve 35 into the combustion chamber 36 of the motor, and into a duct 37 containing a throttle valve 38. Again, from duct 37 is branched off a duct 39, provided with a check valve 40, into the driving fluid inlet of the injector pump 41 by a suction duct 42, containing a check valve 43, with the tank 23 holding the oxidizer fluid I, and a duct 44 containing a check valve 45 and leading into the driving fluid inlet of pump 25. The delivery end of pump 41 is connected by a duct 46, containing a spark plug 48. For starting the pumps, a duct 49, provided with a stop valve 50 and connected to the duct 37, furnishes pump driving fluid for starting the pumps from an outside source, not shown.

In operating this system the spark plug or other fuel igniting means of the motor is energized and the starting driving fluid valve opened for actuating both pumps simultaneously to inject the fuel and the oxidizer into the combustion chamber to form therein a combustible mixture to be ignited. The fuel delivered by the injector pump II and passing through the coil inserted between the inner and outer motor walls is heat pressurized by motor waste heat with rising motor temperature. The greatest portion of the delivered fuel is injected directly into the motor combustion chamber and the remaining portion thereof is used as driving fluid for both the fluid I and the fluid II pumps. The driving fluid passing through pump I mixes with oxidizer forced into the combustion chamber and forms, together with the already injected fuel, a proper combustible mixture, whereas in pump II the driving fluid mixes with new fuel and is returned therewith to the heat exchanger. As soon as the motor provides sufficient heat for properly energizing the fuel passing through the coil to furnish the pumps with driving fluid at proper valve setting for best motor performance the outside source of driving fluid is shut off and also the ignition, so that the fuel supply system operates as a self-contained unit having no movable parts.

This system may be used for any combination of two fluids or also for three fluids such as liquid oxygen-alcohol water mixture so that the system as a whole is a two-fluid system. It also is applicable for any number of multiple-fluid systems. In each individual pumping case the driving fluid of the injector pump is of such characteristic that it can be condensed, in addition it must be of such thermodynamic condition that an enthalpy drop will be produced when a pressure drop through the inlet nozzle or nozzles occurs.

Figure 3:
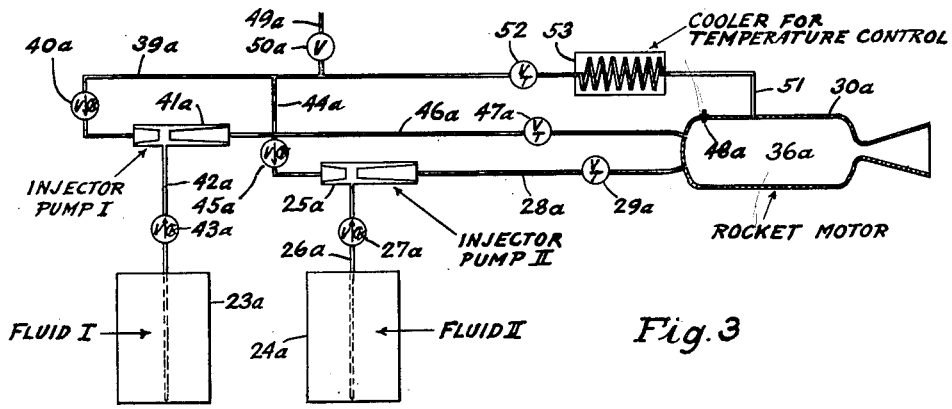
Fig. 3 is a modification of the two-fluid fuel supply system, shown in Fig. 2, in which the injector pumps are driven by motor exhaust gases.

A modified form of the arrangement for a two-fluid rocket motor fuel supply system shown in Fig. 2 is illustrated in Fig. 3 in which parts similar to those in Fig. 2 are designated with the same number having the index "a" added. In this arrangement the injector pump 41a is connected by a suction duct 42a containing a check valve 43a to the tank 23a containing fluid I, and, similarly, injector pump 25a is connected by a suction duct 26a containing a check valve 27a to the tank 24a containing fluid II. A delivery duct 46a provided with a throttle valve 47a, and a delivery duct 28a provided with a throttle valve 29a, respectively, lead from pump 41a and pump 25a to the combustion chamber 36a of motor 30a where both fluids form together a combustible mixture to be ignited by the spark plug 48a. An exhaust duct 51 coming from the combustion chamber 36a and, being provided with a throttle valve 52, passes in heat exchange form, for example, a coil, through an adjustable air or other cooler 53 and is branched off into duct 39a, containing a check valve 40a, and into a duct 44a containing a check valve 45a. The duct 39a being connected to the driving fluid inlet of the oxidizer pump 41a and the duct 44a to that of the fuel pump 25a. A duct 49a provided with a stop valve 50a connects to the exhaust duct 51 with an outside starter fluid source.

The operation of this modified system is in principle the same as that shown in Fig. 2, except that hot motor exhaust gases, instead of heat energized fuel, are used as driving fluid for operating the pumps. In such case the use of liquid hydrogen as fuel and oxygen or fluorine as oxidizer are used with advantage because the exhaust gases therefrom will readily condense in the pumps to make them work.

Figure 4:
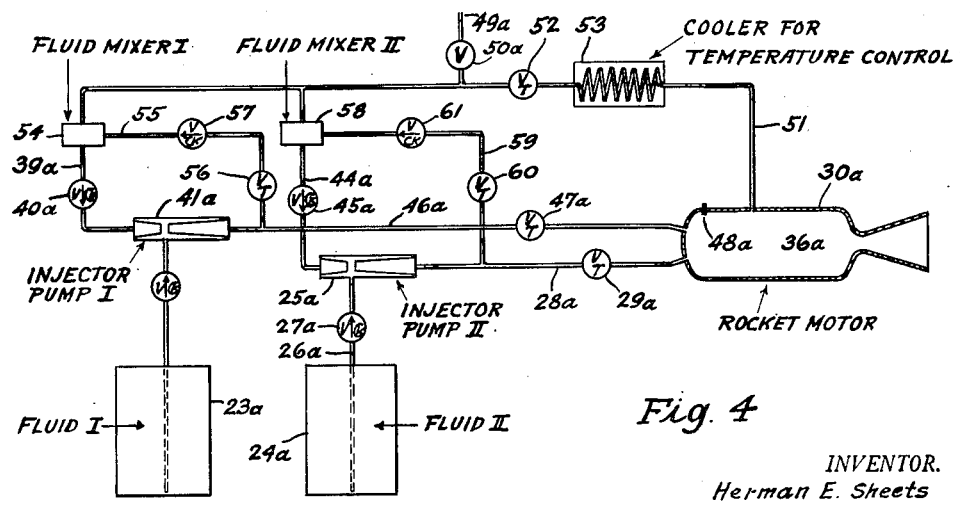
Fig. 4 illustrates a variation of the arrangement shown in Fig. 3, insofar as the injector pumps are driven by a mixture of motor exhaust gases and a small portion of high pressure fluid delivered by each pump.

An arrangement similar to that shown in Fig. 3 is illustrated in Fig. 4 in which all parts have been designated identically, except the parts added. Therefore, the description in this case can be restricted to this addition which includes a fluid mixer 54 in the driving fluid duct 39a into which leads from the pump delivery duct 46a a feed-back duct 55 provided with a throttle valve 56 and a check valve 57. Likewise, a fluid mixer 58 in the driving fluid duct 44a is connected by the feed-back duct 59, including a throttle valve 60 and a check valve 61 with the pump delivery duct 28a.

This modified construction operates in the same manner as that shown in Fig. 3, except that the exhaust gases driving the injector pumps I and II are mixed in the fluid mixers I and II with fluid I and II, respectively, permitting additional temperature and pressure control of the pump driving fluid and, accordingly, of the pump performances.

Having described the invention and the method of its operation, it will be understood that the employment of injector pumps for delivering liquid propellants to internal combustion motors, especially those of the jet and rocket type, are definite improvements over those of a fuel supply system using mechanical pumps, inasmuch as no moving parts are involved. The use of injector pumps makes such a fuel supply system not only simpler in construction and operation than one being equipped with mechanical pumps, but it also has the advantage of lighter weight, greater freedom of installation. Besides, it eliminates auxiliary power supply requirements after starting the motor and reduces cost.

While certain representative embodiments and details have been shown for the purpose of illustrating the invention, it will be apparent to those skilled in the art that various changes and modifications may be made therein without departing from the spirit or scope of the invention.

What is claimed:

In combination with a jet motor a fuel supply system having no movable parts comprising a tank for liquid fuel, an injector type pump, a suction duct, including a check valve, extending from said tank and being connected to the pump, a fuel duct circuit connecting the delivery end and driving fluid inlet of the pump, said duct circuit including in consecutive order, starting from the pump delivery end, a metering check valve, a heat exchanger positioned remotely from the motor, means including a throttle valve for supplying the heat exchanger with hot motor combustion gases to energize the fuel passing through the heat exchanger into the fuel pump as driving fluid, a branch fuel duct leading from said duct circuit intermediate said pump and said metering valve to the motor, the metering valve determining the fuel portions admitted to the motor and to the heat exchanger, respectively, and a starting heater connected to the fuel duct circuit for furnishing pump driving fluid before sufficient motor waste heat for the heat exchanger becomes available.

References Cited in the file of this patent

UNITED STATES PATENTS

| | | |
|---|---|---|
| 2,395,403 | Goddard | Feb. 26, 1946 |
| 2,505,798 | Skinner | May 2, 1950 |
| 2,558,483 | Goddard | June 26, 1951 |
| 2,612,752 | Goddard | Oct. 7, 1952 |

FOREIGN PATENTS

| | | |
|---|---|---|
| 3,407 | Great Britain | Feb. 11, 1910 |